(12) United States Patent
Shavell et al.

(10) Patent No.: US 10,009,316 B1
(45) Date of Patent: Jun. 26, 2018

(54) METHOD OR MECHANISM FOR DETECTING NETWORK INTRUSION WITH GATEWAY IP GEOLOCATION

(71) Applicant: Symantec Corporation, Mountain View, CA (US)

(72) Inventors: Michael Shavell, Merrimack, NH (US); Keith Newstadt, West Newton, MA (US)

(73) Assignee: SYMANTEC CORPORATION, Mountain View, CA (US)

( * ) Notice: Subject to any disclaimer, the term of this patent is extended or adjusted under 35 U.S.C. 154(b) by 99 days.

(21) Appl. No.: 14/747,907

(22) Filed: Jun. 23, 2015

(51) Int. Cl.
G06F 9/28 (2006.01)
H04L 29/06 (2006.01)

(52) U.S. Cl.
CPC .............. H04L 63/02 (2013.01); H04L 63/10 (2013.01); H04L 63/1441 (2013.01)

(58) Field of Classification Search
CPC ...... H04L 63/02; H04L 63/10; H04L 63/1441
See application file for complete search history.

(56) References Cited

U.S. PATENT DOCUMENTS

| 7,366,919 B1* | 4/2008 | Sobel .................... H04L 51/12 713/150 |
| 7,546,637 B1* | 6/2009 | Agbabian ............... H04L 63/20 709/223 |
| 8,646,074 B1* | 2/2014 | Gangadharan ........ H04W 12/12 726/22 |
| 8,769,267 B2* | 7/2014 | Gutt ....................... H04L 45/00 709/238 |
| 2005/0021738 A1* | 1/2005 | Goeller ............. H04L 29/12009 709/224 |
| 2006/0282660 A1* | 12/2006 | Varghese ............. G06Q 20/341 713/155 |
| 2007/0266257 A1* | 11/2007 | Camaisa ............. H04L 63/0838 713/182 |
| 2008/0045233 A1* | 2/2008 | FitzGerald ............ G01S 5/0242 455/456.1 |
| 2008/0072305 A1* | 3/2008 | Casado ............... H04L 63/0492 726/11 |
| 2008/0295171 A1* | 11/2008 | Singh .................. H04L 63/1416 726/23 |
| 2009/0092134 A1* | 4/2009 | Herrera Schuvab ............ G06Q 20/3224 370/389 |
| 2011/0093522 A1* | 4/2011 | Chen ................. H04L 29/12066 709/203 |
| 2012/0102219 A1* | 4/2012 | Speckbacher ..... H04L 29/12066 709/238 |
| 2012/0144002 A1* | 6/2012 | Naganuma ............ G06F 3/0605 709/220 |
| 2012/0246720 A1* | 9/2012 | Xie ....................... H04L 63/145 726/22 |

(Continued)

Primary Examiner — Khoi V Le
(74) Attorney, Agent, or Firm — Maschoff Brennan

(57) ABSTRACT

A method for detecting network intrusion, performed by a processor is provided. The method includes coupling a computing or communication device to a network device and determining a geolocation of the network device. The method includes comparing the geolocation of the network device to an expected value and determining whether to connect to a network based on the comparing. A computer readable media containing instructions and a device are also provided.

16 Claims, 7 Drawing Sheets

(56) References Cited

U.S. PATENT DOCUMENTS

| | | | | |
|---|---|---|---|---|
| 2012/0322449 | A1* | 12/2012 | Shimizu | H04W 36/24 |
| | | | | 455/436 |
| 2013/0227061 | A1* | 8/2013 | Liu | H04L 67/18 |
| | | | | 709/217 |
| 2013/0304578 | A1* | 11/2013 | Kannan | G06Q 30/0261 |
| | | | | 705/14.54 |
| 2014/0282877 | A1* | 9/2014 | Mahaffey | H04L 63/0853 |
| | | | | 726/3 |

* cited by examiner

METHOD OR MECHANISM FOR DETECTING NETWORK INTRUSION WITH GATEWAY IP GEOLOCATION

BACKGROUND

Connecting to the Internet by Wi-Fi (wireless fidelity) is a popular activity for users of smart phones, laptop computers and other portable or mobile user devices. However, wireless hotspots are exploitable and anyone with a bit of knowledge could walk into a café, a bus, or other public or private area, and operate a wireless network intrusion device allowing the attacker to intrude upon all of the connected endpoints. The detection of these devices can be very difficult. Devices that snoop on these types of wireless connections are designed to stay hidden and can simply create a pass through network allowing the attacker to gain access to all traffic passed. With new devices and technologies, solutions are needed, especially in the move to mobile, which can detect and try to warn the user that there is potential for intrusion. These technologies should work across mobile and PC platforms, allowing endpoints to detect these possible breaches.

It is within this context that the embodiments arise.

SUMMARY

In some embodiments, a method for detecting network intrusion, performed by a processor is provided. The method includes coupling a computing or communication device to a network device and determining a geolocation of the network device. The method includes comparing the geolocation of the network device to an expected value and determining whether to connect to a network based on the comparing.

In some embodiments, a tangible, non-transitory, computer-readable media having instructions thereupon which, when executed by a processor, cause the processor to perform a method is provided. The method includes coupling a computing or communication device to a network device and forming a gateway address snapshot relative to the network device. The method includes determining a geolocation of the network device, based on the gateway address snapshot, comparing the geolocation of the network device to an expected value, and determining whether to connect to a network based on the comparing.

In some embodiments, a device with network intrusion detection is provided. The device includes a computing device that is network-connectable. The computing device is configured to couple to a network device, obtain a gateway address of the network device, determine a geolocation of the network device based on the gateway address, compare the geolocation of the network device to an expected value, and determining whether to connect to a network when the geolocation of the network device does not match the expected value.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Known network intrusion detection mechanisms do not support the ability to geolocate and detect changes or falsification of geolocation of gateway network devices. The presently disclosed system uses geolocation of network devices to detect network intrusion and a compromised network. Embodiments use the public facing IP (Internet Protocol) address, or other identifier of a network device that is acting as a gateway to a network, to determine whether the geographic location of the network device is suspicious. Where described herein with wireless couplings, it should be appreciated that further embodiments can employ wired couplings or other types of couplings, e.g., optical, infrared, etc.

Figure 1A:
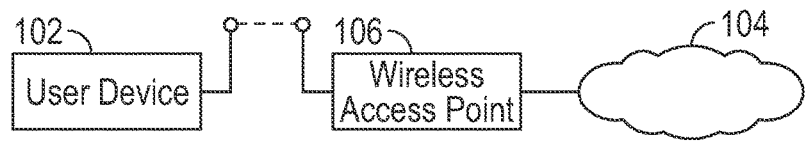
FIG. 1A is a block diagram depicting a user device coupled to a network (e.g., the global communication network known as the Internet, or the cloud) via a wireless access point.
Figure 1B:
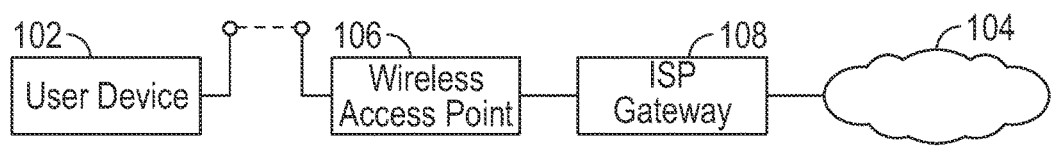
FIG. 1B is a block diagram depicting a user device coupled to the network via a wireless access point and an ISP (Internet Service Provider) gateway.

FIG. 1A is a block diagram depicting a user device 102 coupled to a network 104 (e.g., the global communication network known as the Internet, or the cloud) via a wireless access point 106. This scenario shows a proper or desired connection to the network 104, in contrast to the network intrusion depicted in FIG. 1C. A variation of a user device 102 coupling to a network 104 is shown below with reference to FIG. 1B FIG. 1B is a block diagram depicting a user device 102 coupled to the network 104 (e.g., the global communication network known as the Internet, or the cloud) via a wireless access point 106 and an ISP (Internet Service Provider) gateway 108. This scenario shows a proper or desired connection to the network 104, in contrast to the network intrusion depicted in FIG. 1C. The wireless access point 106 could be a wireless router or hotspot, such as in common usage at home and at hotels, Internet café s, businesses, municipalities, buses, public transportation, etc. In some embodiments, the wireless access point 106 could be a wired router, such as used in some homes, businesses, hotels, etc. Multiple user devices 102, from multiple users, can couple to the wireless access point 106 and thereby connect to the network 104. User devices 102 could include smart phones, computers (laptop, notebook, desktop, etc.), tablets, PDAs (personal digital assistants), or any network-connectable computing or communication device. Activity of the user device 102 is further described below with reference to FIGS. 2-4C.

Figure 1C:
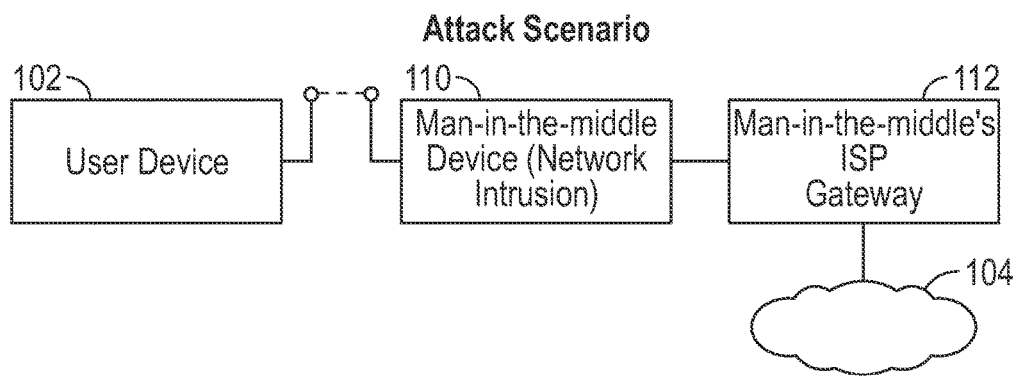
FIG. 1C is a block diagram depicting an attack scenario with a man-in-the-middle network intrusion, in which the user device is coupled to the network via a man-in-the-middle device and the man-in-the-middle's ISP gateway.

FIG. 1C is a block diagram depicting an attack scenario with a man-in-the-middle network intrusion, in which the user device 102 is coupled to the network 104 via a man-in-the-middle device 110 and the man-in-the-middle's ISP gateway 112. This is an example of a malicious rerouting through a pass-through network with attacker access to network traffic. A man-in-the-middle device 110 or other network intrusion device can be wireless (as shown in FIG. 1C), or wired (in further embodiments), and the user device 102 couples to the man-in-the-middle device 110 in a manner similar to coupling to the legitimate wireless access point 106 shown in FIG. 1A. In fact, the man-in-the-middle device 110 in this example is a type of wireless access point, just not a legitimate one since it is owned and operated by an attacker, not a benevolent shop proprietor. The man-in-the-middle device 110, operated by the attacker, creates a pass-through network, routing network traffic of one or more user devices 102 to and from the network 102 via the man-in-the-middle's ISP gateway 112 or other Internet-connected or network-connected device, such as a smart phone. Meanwhile, the man-in-the-middle device 110 can access any of the network traffic, which an attacker can then use for illicit purposes or to further perpetuate theft of identification materials and credentials. For example, the attacker could record messages, logon IDs (identifiers), passwords, financial information, and other data of interest in the network traffic. Examples of man-in-the-middle devices 110 include network devices that can be or have been configured or adapted to form a pass-through network with access to network traffic, such as may be possible with the commercially available Pineapple™, Banana Pi™ and Raspberry Pi™ products.

The embodiments distinguish between such network intrusion scenarios, e.g., as shown in FIG. 1C, and proper or legitimate network connection, e.g., as shown in FIGS. 1A and 1B. User device 102 may employ the mechanism depicted in FIG. 2 or the method depicted in FIG. 4A to establish an expected value for the geolocation of a known or trusted network device, and then use the expected value so established in comparison to the geolocation of a network device that represents itself as being the same known or trusted network device, as depicted in FIG. 3 in some embodiments. Another embodiment is for the user device 102 to employ the mechanism depicted in FIG. 3, using the geolocation of a network device as obtained from a reputation server 206. The use of a stored geolocation value for comparison is shown in the method depicted in FIGS. 4B and 4C.

Figure 2:
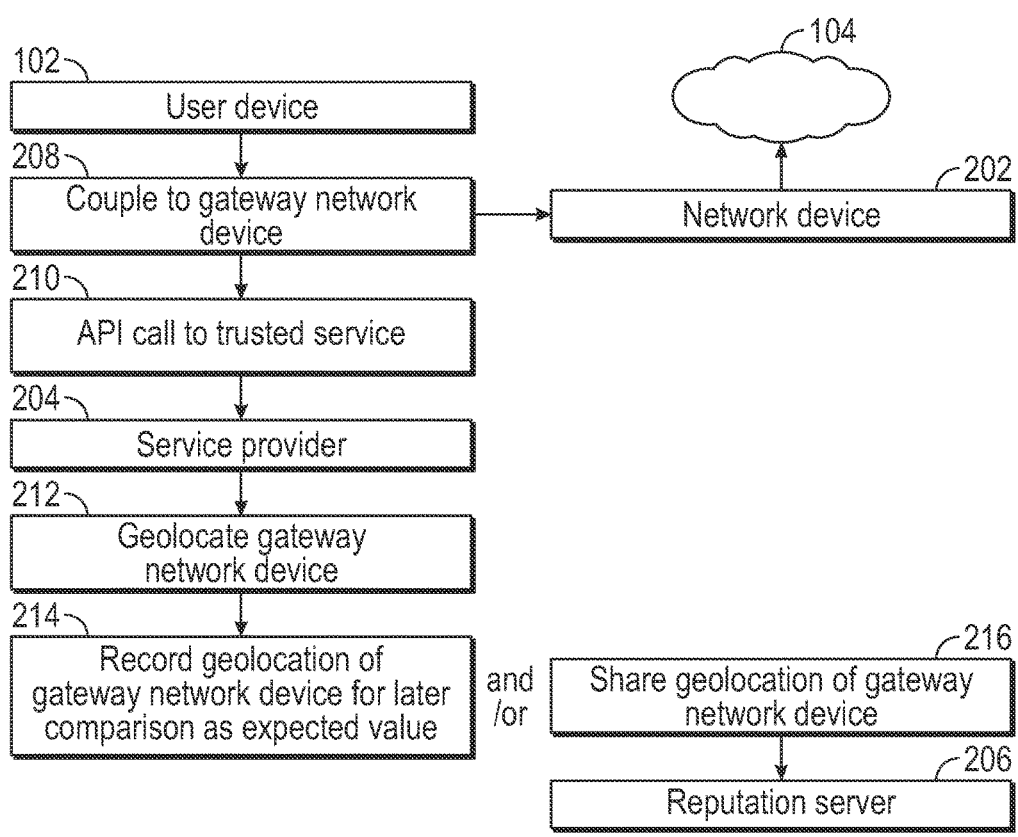
FIG. 2 is a scenario action diagram showing a user device establishing the geolocation of a gateway network device as a known device for later comparison.
Figure 3:
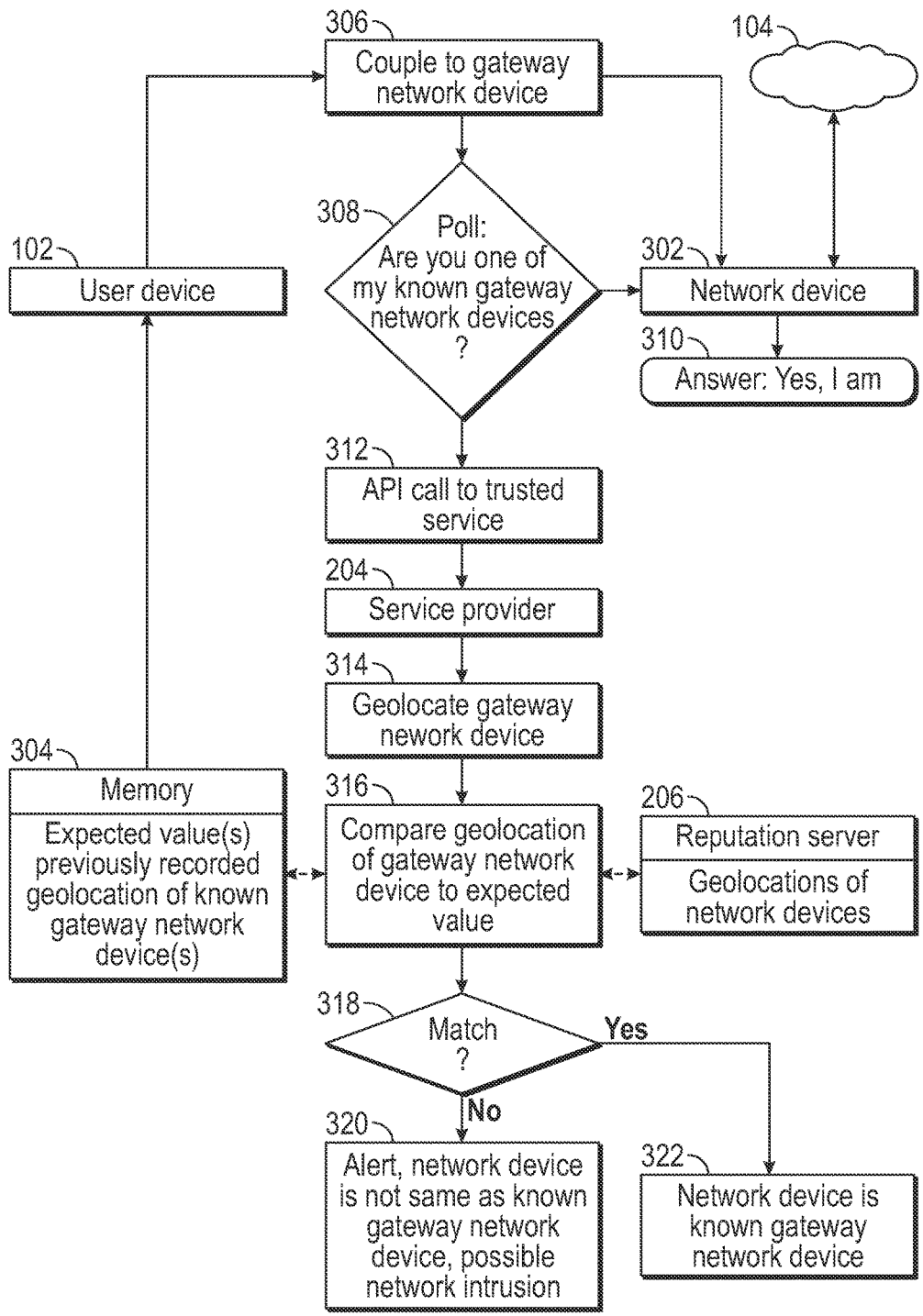
FIG. 3 is a scenario action diagram showing the user device determining whether a network device is the same as a previously known network device, by comparing geolocation of the network device to an expected value.

FIG. 2 is a scenario action diagram showing a user device 102 establishing the geolocation of a gateway network device 202 as a known device for later comparison. For example, the network device 202 could be a wireless access point 106 used at home or a business, or a wireless access point 106 that has been used reliably in the past, etc. This scenario is applicable to the block diagram of FIG. 1A, for example. The user device 102 performs an action 208 to couple to a gateway network device, such as the network device 202 shown in FIG. 2 as connected to the network 104. By gateway network device, it is meant a network device 202 that acts as a gateway to a network 104, such as the wireless access point 106 of FIG. 1A or FIG. 1B. A user device 102 can perform various actions through programming of a processor of the user device 102, or circuitry of the user device 102, and usage of various features of the user device 102.

After coupling to the network device 202, the user device 102 performs an action 210, to make an API (application programming interface) call to a trusted service. For example, the user device 102 could make a post to https://trustedservice.com/whats-my-geolocation, or other service provider 204 that can assist with geo-locating the network device 202. The public IP address of the network device 202 is what is used for geolocation, in some embodiments. While the user device 102 can see the internal LAN (local area network) IP address of the gateway, the user device 102 cannot see the public IP address of the gateway. Since the trusted service, as provided by the service provider 204, is on the public side of the gateway, the trusted service can see the public IP address of the gateway. The public IP address is the source address of the HTTPS connection. The trusted service takes the IP address from the connection, geolocates it, and responds with the geolocation. The user device 102, with the assistance of the service provider 204, performs the action 212, to geolocate the gateway network device 202. That is, the user device 102 determines the geographic location of the gateway network device 202, e.g., by making the call or post to the trusted service, provided by the service provider 204, and receiving a reply from the service provider 204. In some embodiments the user device 102 contacts a service provider 204, such as WHOIS, to determine the geographic location. In another embodiment, the user device 102 contacts a reputation server 206 to determine the geographic location. The user device 102 could couple to the service provider 204, or the reputation server 206, via a separate channel such as a cellular network, or the user device 102 could do so through the network device 202. It should be appreciated that these examples are not meant to be limiting as the examples are meant to be illustrative as alternative mechanisms that may be utilized to determine the geolocation. Once the user device 102 obtains the geolocation of the gateway network device 202, the user device 102 performs an action 214, to record the geolocation of the gateway network device for later comparison as an expected value. In addition to or in place of the action 214, the user device 102 could perform the action 216, to share the geolocation of the gateway network device 202, for example to a reputation server 206.

FIG. 3 is a scenario action diagram showing the user device 102 determining whether a network device 302 is the same as a previously known network device 202, by comparing geolocation of the network device 302 to an expected value. The expected value could be from memory 304 of or coupled to the user device 102, e.g., as recorded for later comparison in the scenario of FIG. 2, or from a reputation server 206, as further discussed below. The scenario of FIG. 3 is applicable to each of the scenarios shown in the block diagrams of FIGS. 1A, 1B and 1C, for example, and further scenarios as readily devised.

To access the network 104 via the network device 302, the user device 102 performs the action 306, to couple to the gateway network device (i.e., the network device 302 acting as a gateway to the network 104). Typically, Wi-Fi capable user devices 102 such as smart phones poll frequently (e.g., every five minutes, or other interval) to look for an available gateway network device, such as a Wi-Fi hotspot. This is depicted in FIG. 3 as the action 308, with the user device 102 polling to ask, "are you one of my known gateway network devices?" (in an appropriate communication format). For example, the user device 102 could ask if the network device 202 is the home router, or the Internet café router, etc., to which the user device 102 has previously connected. In this scenario, the network device 302 responds with the action 310, an answer, "yes, I am" in an appropriate communication format. At this point, it is not yet known whether the network device 302 really is one of the gateway network devices known to the user device 102, or whether the network device 302 might be a network intrusion or man-in-the-middle device 110 falsely representing itself as one of the gateway network devices known to the user device 102, or some other network device. It should be appreciated that the connecting could occur before or after the polling, depending on protocols and other implementation details.

The user device 102 then performs the action 312, to make an API call to a trusted service, in a manner similar to the action 210 described with reference to FIG. 2. The user device 102 performs an action 314, to geolocate the gateway network device 302, with the assistance of the service provider 204 in a manner similar to the action 212 described with reference to FIG. 2. Next, the user device 102 compares the geolocation of the gateway network device 302 to an expected value, in the action 316. The expected value of the geolocation of the gateway network device 302 could be obtained from memory 304, which holds expected values as previously recorded geolocation of known gateway network devices, as described with reference to FIG. 2. In some embodiments, the expected value of the geolocation of the gateway network device 302 could be obtained from a reputation server 206, which holds geolocations of network devices.

Based on the comparison, the user device 102 determines, in an action 318, whether there is a match, i.e., whether the geolocation of the gateway network device 302, as obtained in the action 314, matches the expected value of the geolocation of the gateway network device 302, from the memory 304 or the reputation server 206. If there is a match, the user device 102 could take no action (e.g., ignore the result, and proceed with using the network device 302 to couple to the network 104), or could inform the user that the network device is a known gateway network device (and then proceed with using the network device 302 to couple to the network 104). If there is not a match, i.e., the geolocation of the gateway network device 302 does not match the expected value, the user device 102 performs the action 320, to alert a user that the network device 302 is not the same as the known gateway network device and/or that there is a possible network intrusion.

The above mechanism could detect a network intrusion or man-in-the-middle device 110 misrepresenting itself as a home wireless router or other known network device 202. In these and other cases, the man-in-the-middle device 110 would have a different geolocation than the home wireless router or other known network device 202 as which the network intrusion device 110 misrepresents itself. A user device 102 using the above mechanism detects this difference, and alerts.

Figure 4A:
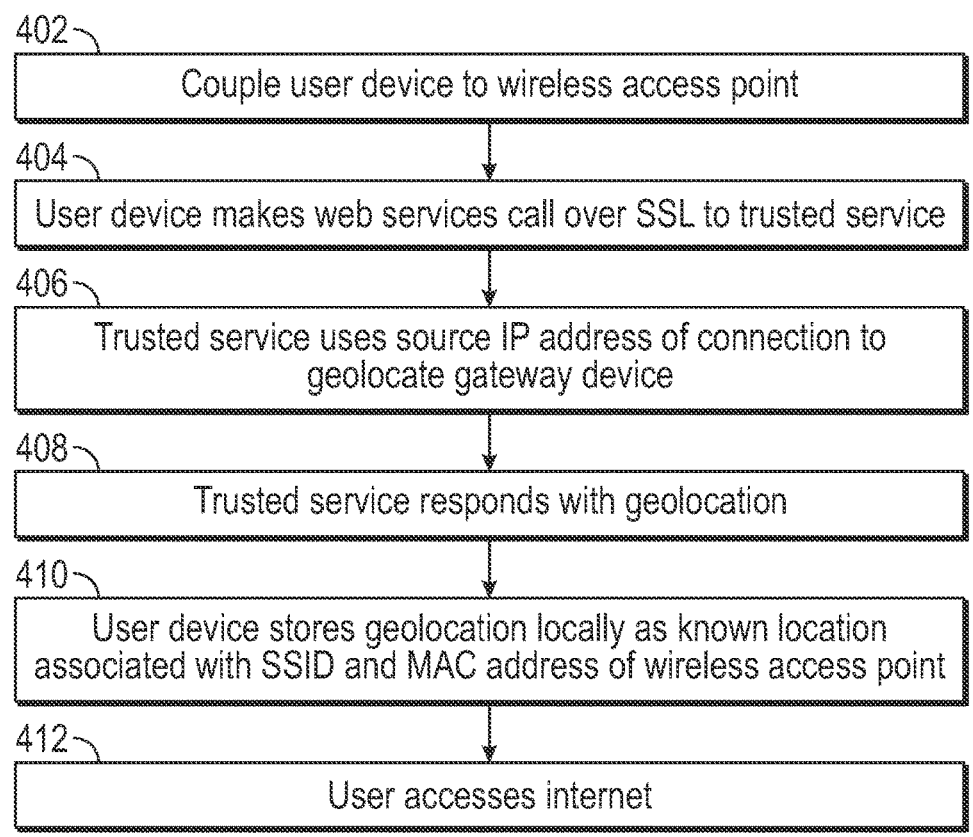
FIG. 4A is a flow diagram of a method for establishing the geolocation of a network device.

FIG. 4A is a flow diagram of a method for establishing the geolocation of a network device. The method(s) of FIGS. 4A-4C can be practiced by a computing or communication device, more specifically by a processor of a user device, such as a computing or communication device, using features of the user device. In an action 402, the user device (e.g., a computing or communication device) couples to a wireless access point or other suitable access point. In an action 404, the user device makes a Web services call over a secure sockets layer (SSL) to a trusted service. Alternatively, some other type of communication or protocol could be used to communicate with a trusted service. In an action 406, the trusted service uses the source IP address, e.g., the public IP address, or alternatively the SSID or the MAC address of the connection to geolocate the gateway device. In an action 408, the trusted service responds with the geolocation of the wireless access point. In an action 410, the user device stores the geolocation of the wireless access point locally as a known location associated with the SSID, MAC address or IP address of the wireless access point. For example, this could be in a memory in the user device. In an action 412, the user accesses the Internet.

Figure 4B:
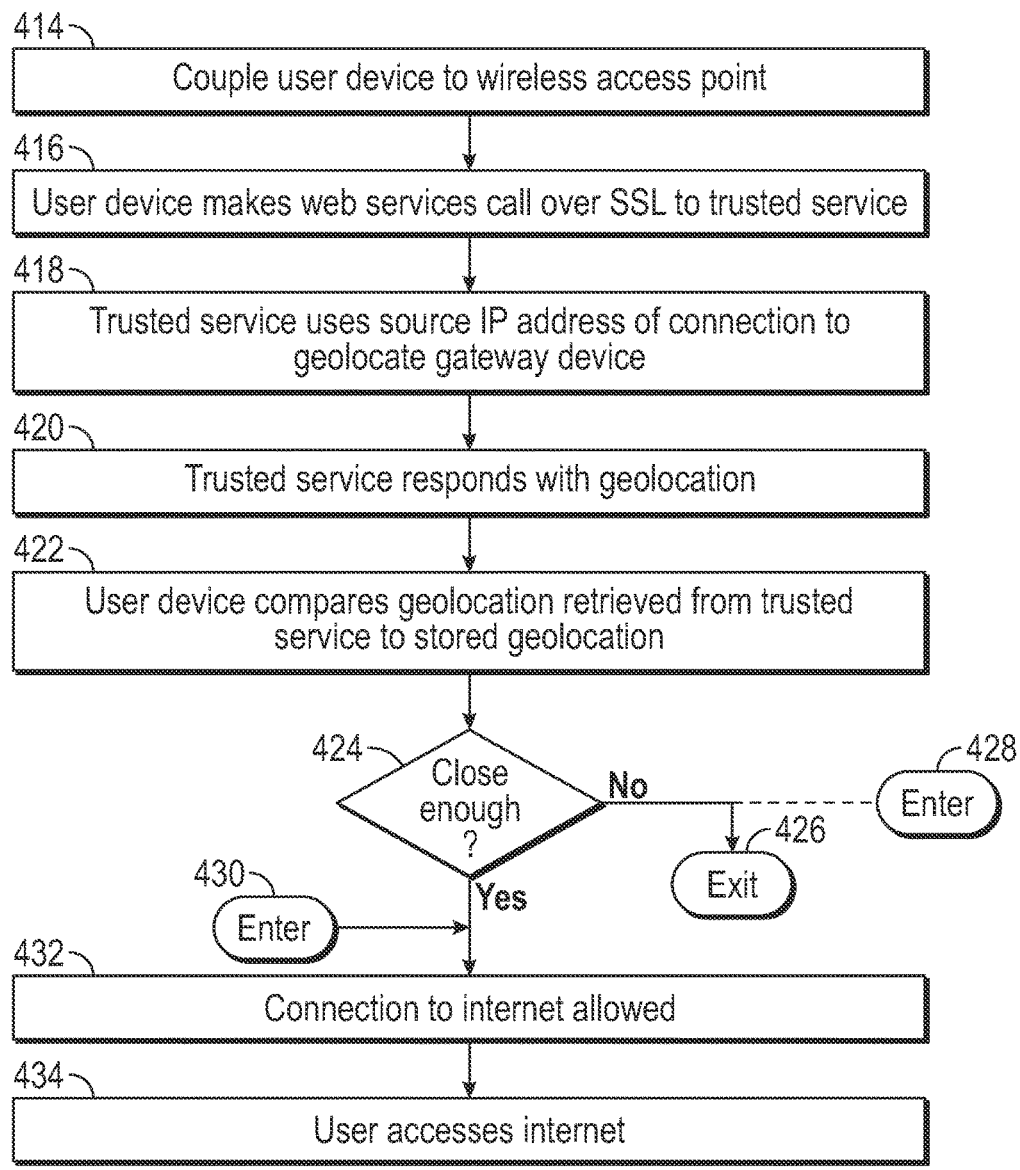
FIG. 4B is a flow diagram of a method for detecting that network intrusion is likely not present, by comparing geolocation of a network device to an expected value.

FIG. 4B is a flow diagram of a method for detecting that network intrusion is likely not present, by comparing geolocation of a network device to an expected value. In an action 414, the user device (e.g., a computing or communication device) couples to a wireless access point. In an action 416, the user device makes a Web services call over a secure sockets layer (SSL) to a trusted service. Alternatively, some other type of communication or protocol could be used to communicate with a trusted service. In an action 418, the trusted service uses the source IP address, e.g., the public IP address, or alternatively the SSID or the MAC address of the connection to geolocate the gateway device. In an action 420, the trusted service responds with the geolocation of the wireless access point. In an action 422, the user device compares the geolocation retrieved from the trusted service to the stored geolocation. Ideally, e.g., for the scenario of Internet connection depicted in FIG. 1A and FIG. 1B, these should match. In a decision action 424, it is determined whether the geolocation retrieved from the trusted service and the stored geolocation are close enough. If the answer is no, they are not, flow branches to the action 426, to exit. Alternatively, flow branches to the action 428 shown in FIG. 4C, to enter and proceed as described below. If the answer to the decision action 424 is yes, the geolocation retrieved from the trusted service and the stored geolocation are close enough (e.g., to within a predetermined distance or other parameter value), flow proceeds to the action 432. In the action 432, connection to the Internet is allowed. In the action 434, the user accesses the Internet. In some versions, the user device informs the user, e.g., with a message, that network intrusion is likely not present at the wireless access point.

Figure 4C:
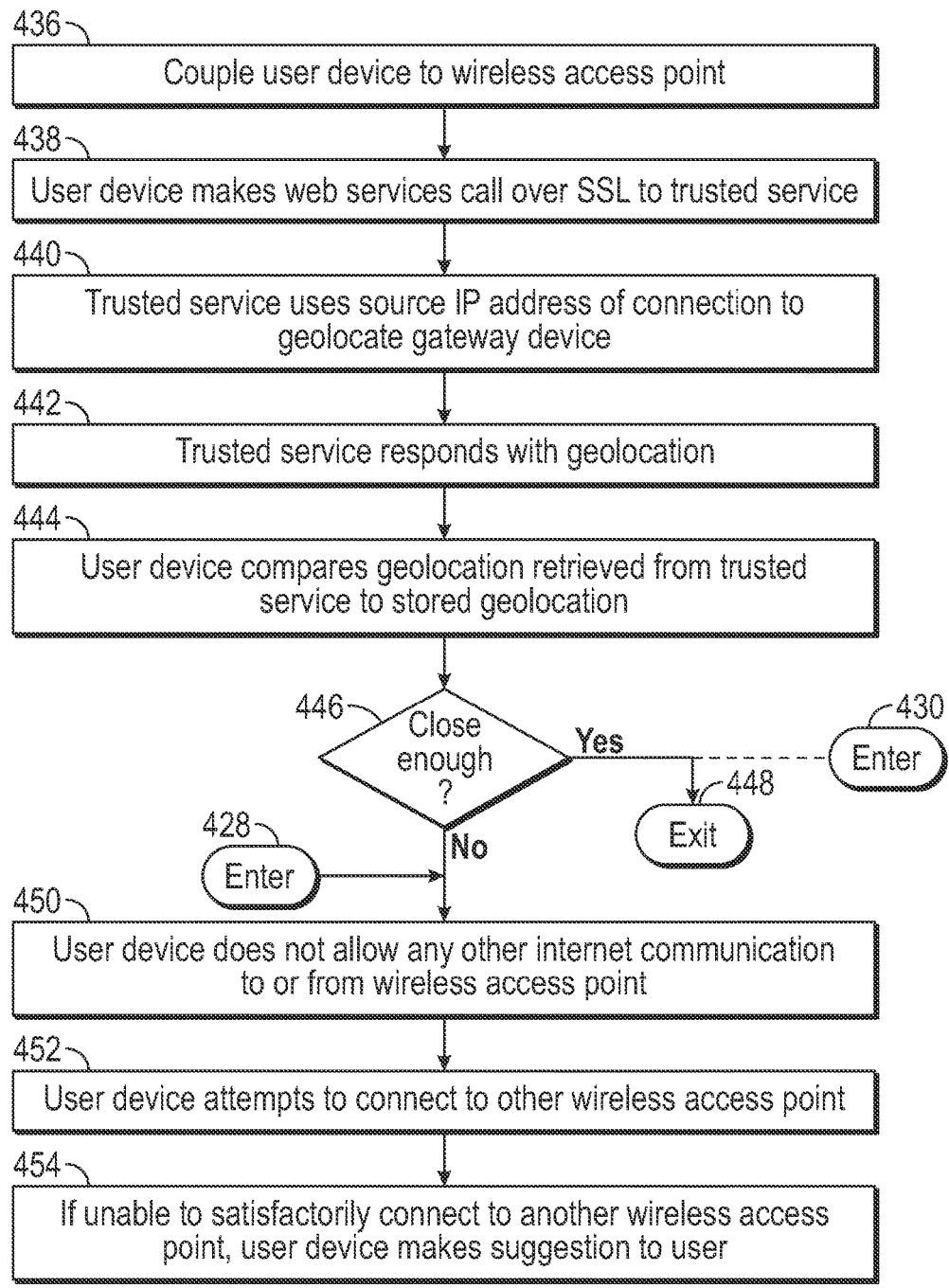
FIG. 4C is a flow diagram of a method for detecting network intrusion, by comparing geolocation of a network device to an expected value.

FIG. 4C is a flow diagram of a method for detecting network intrusion, by comparing geolocation of a network device to an expected value. In an action 436, the user device (e.g., a computing or communication device) couples to a wireless access point or other suitable access point. In an action 438, the user device makes a Web services call over a secure sockets layer (SSL) connection to a trusted service. Alternatively, some other type of communication or protocol could be used to communicate with a trusted service. In an action 440, the trusted service uses the source IP address, the SSID or the MAC address of the connection to geolocate the gateway device. In an action 442, the trusted service responds with the geolocation of the wireless access point. In an action 444, the user device compares the geolocation retrieved from the trusted service to the stored geolocation. Ideally, e.g., for the scenario of Internet connection depicted in FIG. 1A and FIG. 1B, these should match. However, for the attack scenario of Internet connection through a man-in-the-middle device as depicted in FIG. 1C, these do not match. In a decision action 446, it is determined whether the geolocation retrieved from the trusted service and the stored geolocation are close enough. If the answer is no, they are not, flow branches to the action 450. Alternatively, flow is joined from the enter action 428, from a negative answer to the decision action 424 of the flow, and enter action 428, depicted in FIG. 4B. If the answer to the decision action 446 is yes, the geolocation retrieved from the trusted service and the stored geolocation are close enough (e.g., to within a predetermined distance or other parameter value), flow proceeds to the exit action 448, or alternatively proceeds to the enter action 430 of the flow diagram depicted in FIG. 4B and proceeds as described above. In the action 450, the user device does not allow any other Internet communication to or from the wireless access point. In an action 452, the user device attempts to connect to another wireless access point. The actions 436 through 446 may be repeated. In the action 454, if the user device is unable to satisfactorily connect to another wireless access point, the user device makes a suggestion to the user. This could be a message, such as that a reliable wireless access point is not available at present, or that the user is advised to not connect to the presently available wireless access point. The user may or may not decide to connect to the available wireless access point.

Figure 5:
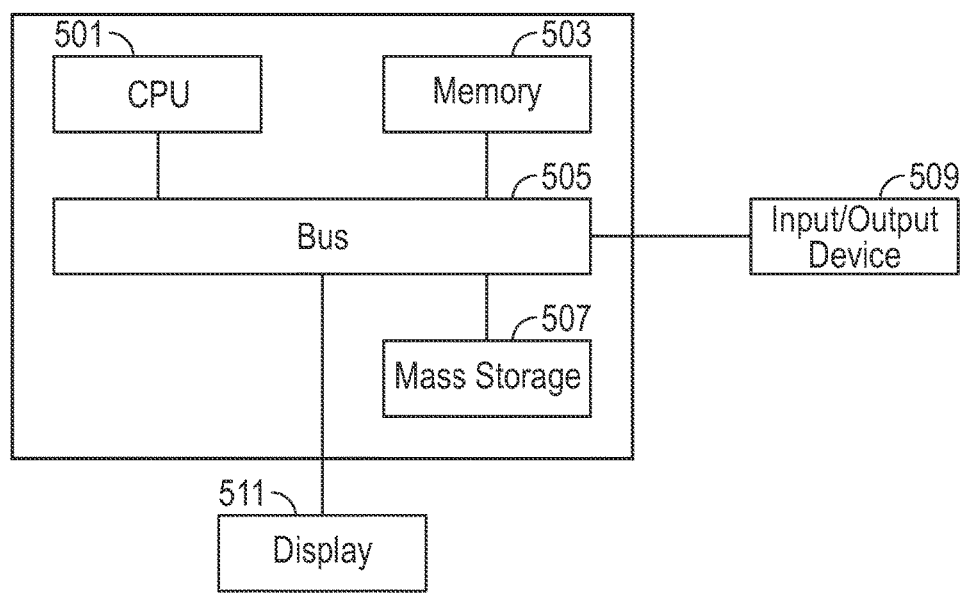
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for detection of network intrusion in accordance with some embodiments. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4C. The code embodying this functionality may be stored within memory 503 or mass storage device 507 for execution by a processor such as CPU 501 in some embodiments. The operating system on the computing device may be MS DOS™, MS-WINDOWS™, OS/2™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for detecting network intrusion, performed by a processor, comprising:
    coupling a computing device to a network device that is external to the computing device;
    receiving, from a trusted service, a geolocation of the network device that the trusted service determined based on a public Internet Protocol (IP) address of the network device;
    recording the geolocation of the network device for later comparison as an expected geolocation of the network device;
    coupling the computing device to a further network device;
    receiving, from the trusted service, a geolocation of the further network device that the trusted service determined based on a public Internet Protocol (IP) address of the further network device;
    determining whether the geolocation of the further network device is within a predetermined geographical distance of the expected geolocation of the network device; and
    in response to determining that the geolocation of the further network device is not within the predetermined geographical distance of the expected geolocation of the network device, preventing connection of the computing device to a network via the further network device to protect the computing device from a network intrusion by the further network device and alerting to notify of the network intrusion by the further network device.

2. The method of claim 1, wherein the geolocation of the network device is received in response to making a web services call to the trusted service.

3. The method of claim 1, further comprising:
    sharing the expected geolocation of the network device with a reputation server.

4. The method of claim 1, wherein:
    the determining of the geolocation of the network device by the trusted service is further based on a service set identifier (SSID) or a media access control (MAC) address of the network device; and
    the trusted service is exterior to the computing device.

5. The method of claim 1, wherein:
    the network device is a wireless access point network device or a gateway network device; and the further network device is a man-in-the-middle network device or a man-in-the-middle gateway network device.

6. A tangible, non-transitory, computer-readable media having instructions thereupon which, when executed by a processor, cause the processor to perform a method comprising:
coupling a computing device to a network device that is external to the computing device;
communicating through the network device to a trusted service;
receiving, from the trusted service, a geolocation of the network device that the trusted service determined based on a public Internet Protocol (IP) address of the network device;
recording the geolocation of the network device for later comparison as an expected geolocation of the network device;
coupling the computing device to a further network device;
receiving, from the trusted service, a geolocation of the further network device that the trusted service determined based on a public Internet Protocol (IP) address of the further network device;
determining whether the geolocation of the further network device is within a predetermined geographical distance of the expected geolocation of the network device; and
in response to determining that the geolocation of the further network device is not within the predetermined geographical distance of the expected geolocation of the network device, preventing connection of the computing device to a network through the further network device to protect the computing device from a network intrusion by the further network device and alerting to notify of the network intrusion by the further network device.

7. The computer-readable media of claim 6, wherein the determining of the geolocation of the network device by the trusted service is further based on a service set identifier (SSID) or a media access control (MAC) address.

8. The computer-readable media of claim 6, wherein the method further comprises:
coupling the computing device to a reputation server; and
sharing the expected geolocation of the network device with the reputation server.

9. The computer-readable media of claim 6, wherein the geolocation of the network device is received in response to providing the public IP address of the network device to the trusted service, via the communicating to the trusted service, as an identifier of the network device.

10. The computer-readable media of claim 6, wherein:
the network device is a wireless access point network device or a gateway network device; and
the further network device is a man-in-the-middle network device or a man-in-the-middle gateway network device.

11. A device with network intrusion detection capabilities, comprising: a computing device that is network-connectable and configured to:
couple to a network device that is external to the computing device;
communicate to a trusted service;
receive, from the trusted service, a geolocation of the network device that the trusted service determined based on a public Internet Protocol (IP) address of the network device;
record the geolocation of the network device for later comparison as an expected geolocation of the network device;
couple the computing device to a further network device;
receive, from the trusted service, a geolocation of the further network device that the trusted service determined based on a public Internet Protocol (IP) address of the further network device;
determine whether the geolocation of the further network device is within a predetermined geographical distance of the expected geolocation of the network device; and
in response to determining that the geolocation of the further network device is not within the predetermined geographical distance of the expected geolocation of the network device, prevent connection of the computing device to a network via the further network device to protect the computing device from a network intrusion by the further network device and alert to notify of the network intrusion by the further network device.

12. The device with network intrusion detection capabilities of claim 11, wherein the determining of the geolocation of the network device by the trusted service includes the trusted service identifying the network device by a service set identifier (SSID), a media access control (MAC) address, or the public IP address of the network device.

13. The device with network intrusion detection capabilities of claim 11, wherein:
the computing device is further configured to couple to a reputation server and to share the expected geolocation of the network device with the reputation server.

14. The device with network intrusion detection capabilities of claim 11, wherein:
the computing device is further configured to couple to a gateway network device, determine a geolocation of the gateway network device, and record the geolocation of the gateway network device as the expected geolocation of the gateway network device for coupling to the gateway network device.

15. The device with network intrusion detection capabilities of claim 11, wherein the network device is a gateway network device, and wherein the computing device is configured to determine whether the further network device is the gateway network device based on whether the geolocation of the further network device is within the predetermined geographical distance of the expected geolocation of the gateway network device.

16. The device with network intrusion detection capabilities of claim 11, wherein:
the network device is a wireless access point network device or a gateway network device; and
the further network device is a man-in-the-middle network device or a man-in-the-middle gateway network device.

* * * * *